US010273612B2

(12) United States Patent
Song et al.

(10) Patent No.: US 10,273,612 B2
(45) Date of Patent: Apr. 30, 2019

(54) SPUNBONDED WEB COMPRISING POLYLACTIC ACID FIBERS

(71) Applicant: 3M INNOVATIVE PROPERTIES COMPANY, St. Paul, MN (US)

(72) Inventors: Liming Song, Woodbury, MN (US); Sachin Talwar, Woodbury, MN (US); John D. Stelter, Osceola, WI (US); John M. Sebastian, Oakdale, MN (US); Nathan E. Schultz, Lakeland, MN (US); Eric M. Moore, Roseville, MN (US); Fuming B. Li, Woodbury, MN (US); Andrew R. Fox, Oakdale, MN (US); Michael R. Berrigan, Oakdale, MN (US); Zackary J. Becker, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 312 days.

(21) Appl. No.: 15/506,213

(22) PCT Filed: Aug. 25, 2015

(86) PCT No.: PCT/US2015/046772
§ 371 (c)(1),
(2) Date: Feb. 23, 2017

(87) PCT Pub. No.: WO2016/033097
PCT Pub. Date: Mar. 3, 2016

(65) Prior Publication Data
US 2017/0241054 A1 Aug. 24, 2017

Related U.S. Application Data

(60) Provisional application No. 62/041,728, filed on Aug. 26, 2014.

(51) Int. Cl.
*B01D 53/22* (2006.01)
*D04H 3/11* (2012.01)
(Continued)

(52) U.S. Cl.
CPC ............. *D04H 3/11* (2013.01); *B01D 39/163* (2013.01); *B01D 46/0032* (2013.01);
(Continued)

(58) Field of Classification Search
CPC .......... B01D 46/521; B01D 2239/0435; B01D 46/0032; B01D 2239/10; B01D 39/163;
(Continued)

(56) References Cited

U.S. PATENT DOCUMENTS 4,215,682 A    8/1980  Kubik
RE30,782 E    10/1981  van Turnhout
(Continued)

FOREIGN PATENT DOCUMENTS

EP      1 510 241 A1    3/2005
JP      2002-161467     4/2002
(Continued)

OTHER PUBLICATIONS

Bourland, "Ultra-high flow PP speeds up PET crystallization, Plastics Engineering", 1987, vol. 43, No. 7, pp. 39-41.
(Continued)

*Primary Examiner* — Anthony R Shumate
(74) *Attorney, Agent, or Firm* — Kenneth B. Wood

(57) ABSTRACT

Spunbonded electret webs comprising polylactic acid fibers, in which at least some of the polylactic acid fibers are meltspun, drawn, charged fibers that include charging additive; and, methods of making such fibers and webs.

25 Claims, 3 Drawing Sheets

(51) Int. Cl.
*D04H 3/14* (2012.01)
*B01D 39/16* (2006.01)
*B01D 46/00* (2006.01)
*B01D 46/52* (2006.01)
*D01D 5/16* (2006.01)
*D04H 3/011* (2012.01)

(52) U.S. Cl.
CPC .............. *B01D 46/521* (2013.01); *D01D 5/16* (2013.01); *D04H 3/011* (2013.01); *D04H 3/14* (2013.01); *B01D 2239/0435* (2013.01); *B01D 2239/10* (2013.01); *D10B 2505/04* (2013.01)

(58) Field of Classification Search
CPC . D04H 3/11; D04H 3/011; D04H 3/14; D10B 2505/04; D01D 5/16
See application file for complete search history.

(56) References Cited

U.S. PATENT DOCUMENTS

| | | |
|---|---|---|
| 5,047,848 A | 9/1991 | Krauter |
| 5,057,710 A | 10/1991 | Nishiura |
| 5,364,694 A | 11/1994 | Okada |
| 5,496,507 A | 3/1996 | Angadjivand |
| 5,908,598 A | 6/1999 | Rousseau |
| 5,919,847 A | 6/1999 | Rousseau |
| 5,968,635 A | 10/1999 | Rousseau |
| 5,976,208 A | 11/1999 | Rousseau |
| 6,268,495 B1 | 7/2001 | Rousseau |
| D449,100 S | 10/2001 | Sundet |
| 6,441,267 B1 | 8/2002 | Dugan |
| 6,521,011 B1 | 2/2003 | Sundet |
| 6,607,624 B2 | 8/2003 | Berrigan |
| 6,858,297 B1 | 2/2005 | Shah |
| 6,916,752 B2 | 7/2005 | Berrigan |
| 6,969,484 B2 | 11/2005 | Horiguchi |
| 7,217,233 B2 | 5/2007 | Masaki |
| 7,470,389 B2 | 12/2008 | Berrigan |
| 7,765,698 B2 | 8/2010 | Sebastian |
| 8,162,153 B2 | 4/2012 | Fox |
| 8,506,669 B2 | 8/2013 | Fox |
| 8,858,986 B2 | 10/2014 | Sholz |
| 2003/0022581 A1 | 1/2003 | Tsai |
| 2005/0148266 A1 | 7/2005 | Myers |
| 2005/0176325 A1 | 8/2005 | Tokuda |
| 2007/0180997 A1 | 8/2007 | Leir |
| 2008/0011303 A1* | 1/2008 | Angadjivand ....... A41D 13/113 128/206.19 |
| 2008/0022642 A1 | 1/2008 | Fox et al. |
| 2008/0038976 A1 | 2/2008 | Berrigan |
| 2009/0293279 A1 | 12/2009 | Sebastian et al. |
| 2010/0048082 A1 | 2/2010 | Topolkaraev |
| 2011/0151737 A1* | 6/2011 | Moore ................. D04H 1/4291 442/334 |
| 2011/0151738 A1* | 6/2011 | Moore ................. D04H 1/4291 442/334 |
| 2012/0040185 A1 | 2/2012 | Topolkaraev |
| 2012/0088424 A1* | 4/2012 | Eric ...................... D04H 1/544 442/400 |
| 2012/0315225 A1* | 12/2012 | Porbeni ................ A61L 15/26 424/49 |
| 2013/0288555 A1 | 10/2013 | Berkemann |
| 2015/0099413 A1* | 4/2015 | Berrigan ........... B01D 67/0093 442/170 |
| 2016/0206984 A1* | 7/2016 | Berrigan ........... B01D 39/1623 |
| 2018/0038026 A1* | 2/2018 | Drews ..................... D04H 3/16 |
| 2018/0051402 A1* | 2/2018 | Rossbach .............. D04H 1/435 |
| 2018/0051404 A1* | 2/2018 | Novarino ................ D01F 8/14 |
| 2018/0178486 A1* | 6/2018 | Mecl ..................... D04H 3/007 |
| 2018/0222143 A1* | 8/2018 | Gilbert ................... B32B 5/022 |

FOREIGN PATENT DOCUMENTS

| | | |
|---|---|---|
| JP | 2006-104589 | 4/2006 |
| JP | 2009-203580 | 10/2009 |
| JP | 5047848 | 7/2012 |
| WO | WO 2009-152349 | 12/2009 |
| WO | WO 2014-105107 | 7/2014 |
| WO | WO 2015-034799 A1 | 3/2015 |
| WO | WO 2015-080913 | 6/2015 |
| WO | WO 2015-199972 | 12/2015 |

OTHER PUBLICATIONS

Garlotta, "A Literature Review of Poly(Lactic Acid); J. of Polymers and the Environment"; 2001, vol. 9, No. 2, pp. 63-84.

Tsai, "Charge Decay Properties of Meltblown Polylactic Acid (PLA) Fabrics", AFS 2010 Annual Conference & Exposition, Mar. 22-25, 2010, San Antonio, TX, pp. 841-867.

Zou, "Effects of Poly(D-lactide acid) on the Properties of Crystallization and Thermal Behavior of Poly(L-lactide acid)", Advances in information Sciences and Service Sciences, Jun. 2012, vol. 4, No. 10, pp. 382-392.

International Search report for PCT International Application No. PCT/US2015/046772 dated Oct. 28, 2015, 3 pages.

Extended European Search Report, EP15836947.0, dated Jan. 23, 2018, 3 pages.

* cited by examiner

SPUNBONDED WEB COMPRISING POLYLACTIC ACID FIBERS

BACKGROUND

Electret webs have found use in various applications involving filtration and the like.

SUMMARY

Herein are disclosed spunbonded electret webs comprising polylactic acid fibers, wherein at least some of the polylactic acid fibers are meltspun, drawn, charged fibers that comprise from about 0.1 wt. % to about 5.0 wt. % charging additive, and wherein the web is a through-air bonded web. Methods of making such fibers and webs are also disclosed. These and other aspects of the invention will be apparent from the detailed description below. In no event, however, should this broad summary be construed to limit the claimable subject matter, whether such subject matter is presented in claims in the application as initially filed or in claims that are amended or otherwise presented in prosecution.

Figure 1:
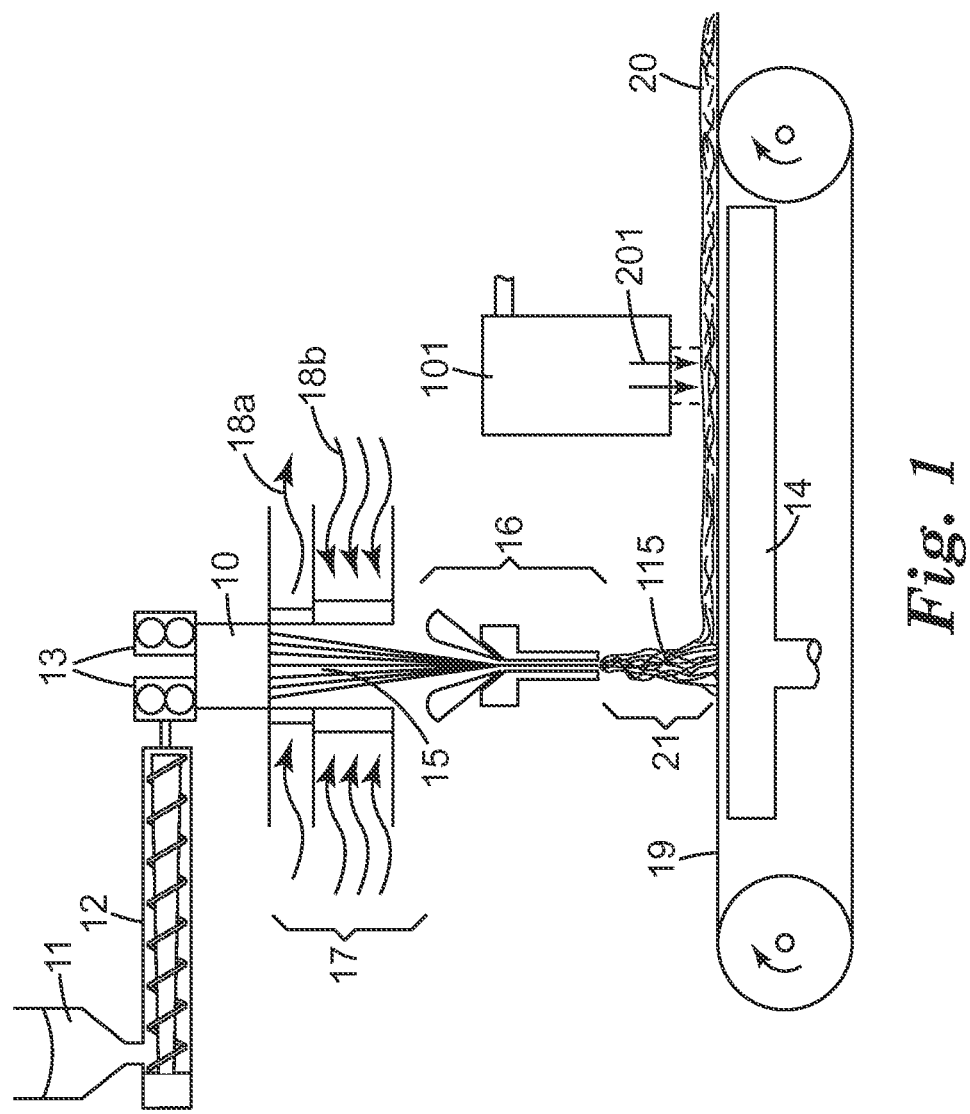
FIG. 1 is a schematic diagram of an exemplary apparatus which may be used to form a spunbonded nonwoven web as disclosed herein.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

DETAILED DESCRIPTION

Glossary

By an electret web is meant a nonwoven web comprising fibers that exhibit at least quasi-permanent electric charges.

The term polylactic acid is used herein for convenience to denote polymers and copolymers that include lactic acid monomer (repeat) units. This term and the terms poly (lactic acid) and poly(lactide) may be used generally interchangeably.

The term "meltspun" as used herein refers to fibers that are formed by extruding molten filaments out of a set of orifices and allowing the filaments to cool and (at least partially) solidify to form fibers, with the filaments passing through an air space (which may contain streams of moving air) to assist in cooling and solidifying the filaments, and with the thus-formed fibers then passing through an attenuation (i.e., drawing) unit to draw the fibers. Meltspinning can be distinguished from meltblowing, which involves the extrusion of molten filaments into converging high velocity air streams introduced by way of air-blowing orifices located in close proximity to the extrusion orifices.

For convenience, the term "filaments" is used in general to designate molten streams of thermoplastic material that are extruded from a set of orifices, and the term "fibers" is used in general to designate solidified filaments and webs comprised thereof. These designations are used for convenience of description only; the ordinary artisan will appreciate that in meltspinning processes the fibers may in some circumstances (e.g. during drawing) still exhibit e.g. a slightly softened or tacky surface.

By "spunbonded" is meant a web comprising a set of meltspun fibers that are collected as a fibrous web and optionally subjected to one or more bonding operations.

The term "web" denotes a mass of nonwoven fibers that are bonded to each other sufficiently that the mass of fibers has sufficient mechanical integrity to be handled as a self-supporting layer; e.g., that can be handled with conventional roll-to-roll web-handling equipment. The term "mat" denotes a mass of fibers that are not bonded to each other sufficiently to form a self-supporting web (e.g. a mass of collected meltspun fibers that are not yet bonded to each other).

By "directly collected fibers" is meant fibers formed and collected as a web in essentially one operation, by extruding molten filaments from a set of orifices, solidifying the filaments to form fibers, drawing the fibers, and collecting the fibers e.g. on a collector surface without the filaments or fibers contacting a deflector or the like between the orifices and the collector surface. Directly collected fibers can be distinguished from e.g. staple fibers, carded webs and the like.

By "pleated" is meant a web at least portions of which have been folded to form a configuration comprising rows of generally parallel, oppositely oriented folds. As such, the pleating of a web is distinguished from e.g. the crimping of individual fibers.

By "solidity" is meant a dimensionless fraction (usually reported in percent) that represents the proportion of the total volume of a fibrous web that is occupied by the solid (e.g. polymeric fibrous) material.

Spunbonded Electret Web

Disclosed herein are spunbonded electret webs comprising polylactic acid fibers, wherein at least some of the polylactic acid fibers are meltspun, drawn, electret-containing (charged) fibers that comprise charging additive. At least some of the polylactic acid fibers of the web are autogenously melt-bonded to each other, e.g. by way of being through-air bonded.

A polylactic acid polymer or copolymer (e.g., a melt-processable material, in particular a fiber-forming resin) contains lactic acid monomer (repeat) units. Such polymers or copolymers may generally be derived from monomers chosen from any isomer of lactic acid, such as L-lactic acid, D-lactic acid, or mixtures thereof. Polylactic acid may also be formed from anhydrides of any isomer of lactic acid, including L-lactide, D-lactide, meso-lactide, or mixtures thereof. Cyclic dimers of such lactic acids and/or lactides may also be employed. Thus, for example, an L-lactic acid monomer unit of a polylactic acid will be understood as being derivable from an L-lactic acid monomer or from any source that provides an equivalent monomer unit in the thus-formed polymer. Any known polymerization method, such as polycondensation or ring-opening polymerization, may be used to produce such polymers.

A polylactic acid may be an L-lactic acid or D-lactic acid homopolymer; or, it may be a copolymer, such as one that contains L-lactic acid monomer units and D-lactic acid monomer units. (In such polymers, a homopolymer or copolymer designation will be a "stereo" designation based on the tacticity of the monomer units rather than on the chemical composition.) Again, such monomer units may be derived from the incorporation into the copolymer chain of L-lactic acid, D-lactic acid, L-lactide, D-lactide, meso-lactide, and so on. In some embodiments, a polylactic acid may be an L-D copolymer comprised predominately of L-lactic acid monomer units along with a small amount of D-lactic acid monomer units (which may e.g. improve the melt-processability of the polymer). In various embodiments, a polylactic acid copolymer may comprise at least about 85, 90, 95, 96, 97, 98, 99, 99.5, or 99.7 weight % L-lactic acid monomer units. In further embodiments, a polylactic acid copolymer may comprise at most about 15, 10, 5, 4, 3, 2, 1, 0.5, or 0.3 weight % D-lactic acid monomer units.

In some embodiments, substantially all (i.e., 99.5 wt. % or greater) of the polylactic acid content of the meltspun fibers (and/or of the entire polymeric content of the meltspun fibers) may be provided by polylactic acid (stereo)copolymer; e.g. a copolymer comprised predominately of L-lactic acid monomer units along with a small amount of D-lactic acid monomer units. (In specific embodiments, substantially all of the polylactic acid content of the fibers may be in the form of L-lactic acid homopolymer.) In other embodiments, an additional, small amount of polylactic acid consisting of D-lactic acid (stereo)homopolymer may be present. Adding such an additional amount of D-lactic acid homopolymer (e.g. as a physical blend, e.g. as a melt additive during extrusion) may in some cases enhance certain properties (e.g. melt-processability, nucleation rate, and so on) of the polylactic acid materials. Thus in various embodiments, a polylactic acid used e.g. in meltspinning may comprise at least about 0.5, 1, 2, 3, 5, or 8 wt. % of a D-lactic acid homopolymer additive. In further embodiments, such a polylactic acid material may comprise at most about 15, 10, 8, 5, 3, 2, 1, or 0.5 wt. % of a D-lactic acid homopolymer. (In such cases, the balance of the polylactic acid fiber-forming material may be e.g. an L-D stereocopolymer as noted above.)

In some embodiments, at least some polylactic acid that is present in the meltspun fibers may be a (compositional) copolymer that comprises one or more additional (non-lactic acid) monomer units. Such monomer units might include e.g. glycolic acid, hydroxypropionic acid, hydroxybutyric acid, and the like. In various embodiments, lactic acid monomer units (whether L or D, and being derived from whatever source) may make up at least about 80, 85, 90, 95, 97, 99, or 99.5 weight % of the meltspun polylactic acid fibers.

Melt-processable (fiber-forming) polylactic acid polymer materials (e.g., L-D copolymers) are commercially available e.g. from Natureworks LLC of Minnetonka, Minn., under the trade designations INGEO 6100D, 6202D, and 6260D. Melt-processable polylactic acid polymer materials (e.g., D-lactic acid homopolymers) are available e.g. from Synbra Technologies, The Netherlands, under the trade designation SYNTERRA PDLA 1010. Many other potentially suitable polylactic acid materials are also available.

In various embodiments, the drawn and autogenously bonded (e.g., through-air bonded) charging-additive-containing polylactic fibers may exhibit a % crystallinity of at least about 20, 30, 40, or 50%.

In various embodiments, polylactic acid may make up (in weight percent) at least about 85, 90, 95, 96, 97, 98, 99, or substantially all (i.e., 99.5 or more) or essentially all (i.e., 99.9% or more) of the materials (e.g., the polymeric materials) of the meltspun polylactic acid fibers. In some embodiments, a small amount of non-polylactic acid polymer material may be present in at least some of the meltspun fibers (e.g., added to the polylactic acid as a melt additive in the extrusion process). Some such non-polylactic polymer materials may serve e.g. as polymeric nucleating agents (irrespective of whether e.g. any D-lactic acid homopolymer may be present and may serve a similar purpose, as discussed earlier). In this context a molecular weight of 4000 grams per mole may serve as the dividing line between polymeric and non-polymeric nucleating agents. Any suitable non-polylactic acid polymer may be used as desired, in any suitable amount. In particular embodiments, a polyolefinic material (e.g., polypropylene) may be present in at least some meltspun fibers, at a wt. % of up to about 5, 3, 2, 1, or 0.5. In other embodiments, substantially no (i.e. less than 0.5 wt. %) or essentially no (i.e. less than 0.1 wt. %) polyolefinic material is present in the meltspun polylactic acid fibers.

In some embodiments, a small amount of non-polylactic acid meltspun fibers, or non-meltspun non-polylactic acid fibers (e.g. staple fibers, multicomponent binding fibers, and so on) may be present in the web. In various embodiments, polylactic acid fibers may make up (in weight percent) at least about 85, 90, 95, 96, 97, 98, 99, or substantially all (i.e., 99.5 or more) of the total fibrous material of the web. In such embodiments, any non-polylactic acid fibers may make up less than about 15, 10, 5, 4, 3, 2, 1, 0.5, or 0.1 wt. % of the total fibrous material of the web.

At least some of the polylactic acid meltspun fibers comprise charging additive (which term includes both a single charging additive, and combinations of two or more charging additives). In various embodiments, charging additive makes up at least about 0.1, 0.2, 0.4, 0.6, 0.8, 1.0, 1.4, or 1.8 wt. % of the meltspun fibers of the web. In further embodiments, charging additive makes up at most about 3.0, 2.0, 1.6, 1.2, 1.1, 0.8, or 0.6 wt. % of the meltspun fibers of the web. Often, such a charging additive may be conveniently added to the polylactic acid fiber-forming resin as a melt additive in the extrusion process.

Any suitable charging additive may be used that may enhance the ability of the meltspun polylactic acid fibers to accept and/or retain electric charge (so that the fibers possess comprise quasi-permanent charges commonly referred to as electrets). Compounds that are potentially useful as charging additives in at least some embodiments include organic triazine compounds (including oligomers), which compounds may contain at least one nitrogen atom in addition to those in the triazine ring (see e.g. U.S. Pat. Nos. 6,268,495, 5,976,208, 5,968,635, 5,919,847, and 5,908,598 to Rousseau). Particular examples of potentially suitable compounds include (such as 2-(4,6-biphenyl-1,3,5-triazine-2-yl)-5-((hexyl) oxy) phenyl and other phenols containing triazine rings and the like. In some embodiments, hindered amine compounds may be used. Such compounds are sometimes referred to as hindered amine light stabilizers (HALS), and are characterized by the presence of one or more amine moieties within a crowded steric environment. Such compounds often comprise one or more 2,2,6,6-tetraalkylpiperidyl groups, e.g. one or more 2,2,6,6-tetraalkylpiperidyl-4-amino groups. In various embodiments, the 2,2,6,6-tetraalkylgroups may be aliphatic groups with 1 to 6 carbon atoms, for example hexyl-, pentyl-, butyl-, propyl-, ethyl- and methyl-groups. In specific embodiments, all four alkyl groups may be methyl groups. Such a piperidyl group may be e.g. covalently bound at the 4-position or via the 4-amino group to another organic group, as desired.

In some embodiments, aliphatic metal salts (such as magnesium stearate, aluminum stearate, and other $C_{8-24}$ carboxylic acid metal salts and the like) may be used, either alone or in combination with another type of charging additive, e.g. a hindered amine and/or an organic amide. Various carboxylic acid metal salts, hindered amines, and organic amides that may be suitable for use as charging additives are described in U.S. Patent Application Publication 2013/0288555 to Berkemann.

In some embodiments, one or more fused aromatic urea or thiourea compounds may be used, e.g. as described in U.S. Provisional Patent Application 62/015637, filed 23 Jun. 2014 and entitled ELECTRET WEBS WITH CHARGE-ENHANCING ADDITIVES, which is incorporated by reference herein. Still other materials that are potentially useful as charging additives include N-substituted amino aromatic compounds (particularly tri-amino substituted compounds) that are described in U.S. Pat. No. 7,765,698 to Sebastian and U.S. Pat. No. 5,057,710 to Nishiura, and those mentioned in U.S. Patent Application Publication 2007/0180997 to Leir, and those mentioned in Japanese Patent Publication 5047848 to Nakamura, all of which are incorporated by reference herein in their entirety. Other general classes of materials that may include compounds that may function suitably as charging additives include e.g. light stabilizers, primary and secondary antioxidants, metal deactivators, hindered phenols, fatty acid metal salts, fluorine-containing compounds, and melamines. Other potentially suitable compounds include N-substituted amino aromatic compounds, particularly tri-amino substituted compounds, such as 2,4,6-trianilino-p-(carbo-2'-ethylhexyl-1'-oxy)-1,3,5-triazine commercially available under the trade designation UVI-NUL T-150 from BASF, Ludwigshafen, Germany. Another potentially suitable compound is available from Ciba Specialty Chemicals, Inc. under the trade designation CHIMASSORB 944. Still another potentially suitable compound is 2,4,6-tris-(octadecylamino)-triazine, also known as tristearyl melamine. The foregoing is merely a non-limiting list of exemplary compounds that may be useful as charging additive, and it is noted that there may be overlap between compounds in the various categories.

Any ancillary material (e.g., non-polymeric additive) may be present in at least some of the meltspun polylactic acid fibers, for any purpose. Such materials may include e.g. one or more antioxidants, UV-stabilizers, processing aids, antimicrobial agents, pigments, dyes, and so on. In some embodiments, the meltspun fibers may comprise one or more non-polymeric nucleating agent(s). However, in particular embodiments, essentially no (i.e., less than about 0.01 parts by weight based on 100 parts by weight of the polylactic acid) non-polymeric nucleating agent (e.g. of any of the types described in U.S. Patent Application Publication 2005/0176325 to Tokuda) is present in the polylactic acid fibers of the spunbonded web.

Methods of Making

FIG. 1 shows an exemplary apparatus that may be used to form spunbonded webs as disclosed herein. In an exemplary method of using such an apparatus, polylactic acid fiber-forming material (often, in pellet or particulate form) is introduced into hopper 11 (along with a suitable amount of charging additive), whereupon the polylactic acid (and charging additive, if added as a solid) are melted in an extruder 12, and pumped into extrusion head 10 via pump 13.

Extrusion head 10 may be a conventional spinnerette or spin pack, generally including multiple orifices arranged in a regular pattern, e.g., straightline rows. Molten filaments 15 of fiber-forming liquid are extruded from the extrusion head and pass through air-filled space 17 to attenuator 16. The distance the extruded filaments 15 travel through air space 17 before reaching the attenuator 16 can vary, as can the conditions to which they are exposed. One or more streams of air 18 (e.g., quenching air) may be directed toward extruded filaments 15 to reduce the temperature of, and to at least partially solidify, the extruded filaments 15 to become fibers 115. (Although the term "air" is used for convenience herein, it is understood that this term encompasses other gases and/or gas mixtures that may be used in the quenching and drawing processes disclosed herein). If desired, multiple streams of air may be used; e.g., a first air stream 18a blown transversely to the filament stream, which may serve primarily to remove undesired gaseous materials or fumes released during extrusion, and a second quenching air stream(s) 18b that may serve primarily to achieve temperature reduction.

Fibers 115 may then be passed through an attenuator to draw the fibers, as illustrated in FIG. 1. Attenuator 16 is configured to impinge rapidly-moving streams of air onto the fibers, which streams of air are moving at least generally in the same direction as the fibers during at least a portion of the fibers' trip through the attenuator. The moving air thus exerts a shear force on the fibers, which shear force serves to draw the fibers (the moving air in the attenuator may also serve to cool and/or quench fibers 115, beyond any cooling and/or quenching of that may have already occurred in passing through the distance between extrusion head 10 and attenuator 16).

It will thus be appreciated that an attenuator as disclosed herein can serve as an alternative to long-used methods of drawing fibers by e.g. exerting force on the fibers by winding them (e.g. onto a bobbin or spool) at a speed faster than that at which the fibers are initially extruded. Such drawing may serve to achieve at least some orientation of at least a portion of each fiber. Such drawing may also be manifested in a reduction in the final diameter of the fiber from what the diameter would be in the absence of drawing. However, it has been discovered that drawing of polylactic acid fibers that comprise charging additive, can also have additional and unexpected benefits in preserving the fiber charge over high temperature aging, as discussed later herein.

The degree of drawing of fibers 115 may be characterized by the apparent fiber speed, which is calculated by the following equation:

$$V_{apparent}(\text{m/min}) = 4M/\rho\pi d_f^2 \times 1000000$$

where:

M is the polymer flow rate in grams/per orifice per minute,

ρ is the polymer density, in grams per cubic centimeter, and $d_f$ is the measured average fiber diameter in micrometers.

The ordinary artisan will appreciate that the apparent fiber speed takes into account the actual diameters of the fibers as made (i.e., the measured average diameter as obtained e.g. by optical microscopy) and the flow rate of molten filaments through the meltspinning orifices to provide a parameter that is indicative of the degree of drawing which occurred in transforming the extruded molten filaments into drawn fibers. In various embodiments, the apparent fiber speed may be at least about 1000, 2000, 3000, or 4000 meters per minute. In further embodiments, the apparent fiber speed may be at most about 14000, 12000, 10000, 8000, or 6000 meters per minute.

Figure 2:
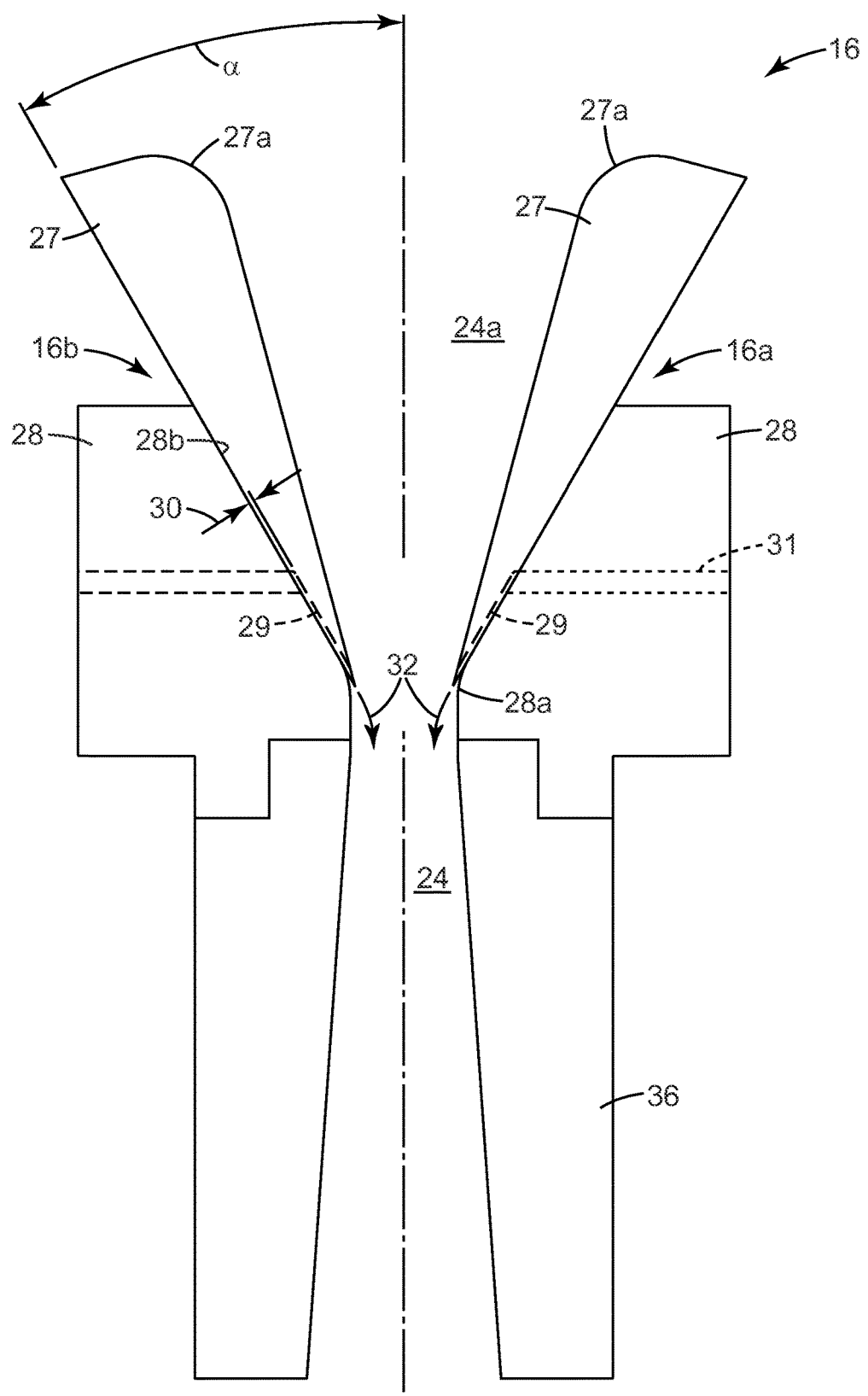
FIG. 2 is a side view of an exemplary attenuator which may be used in the process of FIG. 1.

FIG. 2 is an enlarged side view of an exemplary attenuator 16. Exemplary attenuator 16 in some cases may comprise two halves or sides 16a and 16b separated so as to define between them an attenuation chamber 24, as in the design of FIG. 2. Although existing as two halves or sides (in this particular instance), attenuator 16 functions as one unitary device and will be first discussed in its combined form. Exemplary attenuator 16 includes slanted entry walls 27, which define an entrance space or throat 24a of the attenuation chamber 24. The entry walls 27 preferably are curved at the entry edge or surface 27a to smooth the entry of air streams carrying the fibers 115. The walls 27 are attached to a main body portion 28, and may be provided with a recessed area 29 to establish an air gap 30 between the body portion 28 and wall 27. Air may be introduced into the gaps 30 through conduits 31. The attenuator body 28 may be curved at 28a to smooth the passage of air from the air knife 32 into chamber 24. The angle (α) of the surface 28b of the attenuator body can be selected to determine the desired angle at which the air knife impacts a stream of fibers passing through the attenuator.

Attenuation chamber 24 may have a uniform gap width; or, as illustrated in FIG. 2, the gap width may vary along the length of the attenuator chamber. The walls defining at least a portion of the longitudinal length of the attenuation chamber 24 may take the form of plates 36 that are separate from, and attached to, the main body portion 28. In some embodiments, certain portions of attenuator 16 (e.g., sides 16a and 16b) may be able to move toward one another and/or away from one another, e.g. in response to a perturbation of the system. Such ability may be advantageous in some circumstances. Further details of exemplary attenuators and possible variations thereof are found in U.S. Pat. Nos. 6,607,624, 6,916,752, and 7,470,389 to Berrigan, all of which are incorporated by reference herein.

Fibers 115, after having passed through attenuator 16, may then be deposited onto a collector surface 19 where they are collected as a mass of fibers (mat) 20 as shown in FIG. 1. Collector surface 19 may comprise e.g. a single, continuous collector surface such as provided by a continuous belt or a drum or roll. Collector 19 may be generally porous and gas-withdrawal (vacuum) device 14 can be positioned below the collector to assist in the deposition of fibers onto the collector. The distance 21 between the attenuator exit and the collector, the amount of vacuum applied, and so on, may be varied to obtain different effects.

Regardless of the particular features (e.g., attenuator design, arrangement of the attenuator and collector, etc.) the above-described meltspinning process is distinguished from meltblowing. Specially, the passing of molten filaments through an air gap in which the filaments are at least partially solidified into fibers, followed by the attenuation/drawing of the fibers in a unit that is spaced away from the extrusion head (by the air gap), is distinguished from meltblowing processes in which air is impinged on molten filaments as close as possible to their point of exit from the orifices of the extrusion head. Furthermore, the ordinary artisan will understand that meltspun fibers may be readily distinguished from meltblown fibers, by a variety of characteristics, e.g. the amount and nature of crystalline domains, molecular chain orientation, and so on.

The collected mat 20 of meltspun polylactic fibers may then be subjected to a bonding process in which at least some fibers of the mat are bonded to each other to transform the mat into a fiber web. Any suitable method may be used, whether such method relies on physical entanglement of fibers, melt-bonding of fibers to each other, bonding via some added agent, and so on. In some embodiments, the bonding may involve a thermal treatment (defined broadly herein as meaning exposure of the mat of meltspun, collected fibers to a temperature of at least about 80° C.), which may have particular advantages as discussed in detail herein.

In some embodiments the thermal bonding may take the form of autogenous bonding, defined herein as melt-bonding of polylactic acid fibers to each other at points of contact therebetween, such bonding being performed at an elevated temperature without the application of solid contact pressure onto the mat. (Such a bonding method may thus be contrasted with e.g. calendering, ultrasonic bonding, and the like.) Furthermore, such autogenous bonding does not involve the use of added binder (whether in fiber, powder, or liquid/latex form) or of any added adhesive or the like. Still further, autogenous bonding is distinguished from physical bonding methods such as needle-punching, hydroentanglement and the like. The ordinary artisan will appreciate that autogenous bonding (in particular, through-air bonding as described below), will provide fiber-fiber bonds that are readily distinguishable from bonds achieved by other means (e.g. by calendering or ultrasonic bonding, or by way of an added binder (whether in fiber, liquid, or powder form), or by needle-punching or hydroentangling).

In particular embodiments, the autogenous bonding may take the form of through-air bonding, as achieved by forcefully passing a stream of heated air through the mat of collected fibers (i.e., impinging the heated air onto the mat so that the heated air enters through a first major face of the mat, passes through the thickness of the mat, and exits through a second, opposing major face of the mat, assisted if desired by a vacuum applied to the second major face of the mat). Such bonding may be performed e.g. by the use of through-air bonder 101 as shown in exemplary embodiment in FIG. 1. Exemplary through-air bonders are discussed in detail in U.S. Patent Application Publication 2008/0038976 to Berrigan (which refers to these exemplary through-air bonders as quenched-flow heaters), which is incorporated by reference herein. It may be convenient that the heated, moving air be impinged onto a major surface of the fiber mat in a direction at least substantially normal to the major plane of the fiber mat (as illustrated by arrows 201 showing the direction of heated airflow in FIG. 1).

The ordinary artisan will appreciate that thermal bonding (e.g., autogenous bonding, in particular through-air bonding) may be performed so as to melt-bond a sufficient number of fibers to each other to transform a meltspun fiber mat into a self-supporting fiber web (thus the web may be termed a spunbonded web), without heating the fibers to the point that they collapse or otherwise unacceptably reduce the porosity of the thus-formed web. However, it has also been found that when performed on polylactic acid fibers that comprise charging additive, such a thermal exposure may have additional and unexpected benefits in preserving the fiber charge over high-temperature aging, as discussed in detail elsewhere herein.

Autogenous bonding (e.g., through-air bonding) may utilize moving air that is heated (e.g. to a nominal set point, with the understanding that the air may cool slightly before encountering the fiber mat) to any suitable temperature that is sufficient to adequately bond the particular polylactic fibers used and that is sufficient to achieve the advantageous effects on the preservation of fiber charge that are disclosed herein. In various embodiments, the moving air may be provided at a temperature of at least about 90, 100, 120, 130, 140, 150, 160, or 170° C. In further embodiments, the moving air may be provided at a temperature of at most about 200, 180, 170, 160, 150, or 140° C.

Moving heated air may be impinged on the fiber mat at any linear velocity suitable to achieve the effects described herein. In various embodiments, the linear velocity of the heated air may be at least about 150, 200, 300, 500, 600, or 800 meters per minute. In further embodiments, the linear velocity of the heated air may be at most about 1500, 1200, 1000, 800, or 600 meters per minute. The ordinary artisan will understand that the temperature of the heated moving air and/or the velocity of the heated moving air, may be chosen in combination with the duration of the exposure of the fiber mat to the moving heated air, to achieve a desired cumulative overall thermal exposure. In various embodiments, the duration of exposure to the moving heated air (e.g., the residence time of the mat/web in proximity to the through-air bonder), may be at least about 0.1, 0.2, 0.4, 0.8, 1, 2, or 4 seconds. In further embodiments, the duration of exposure to the moving heated air may be at most about 4, 2, 1, 0.8, or 0.4 seconds.

Any charging method known in the art may be used. Exemplary methods include e.g. corona charging and hydrocharging. In some embodiments, a combination of corona charging and hydrocharging (in any order) may also be used (fibers charged in this manner will be referred to as corona-hydrocharged fibers, with no order of operation being implied). Corona charging may be performed e.g. by exposing the web to a suitable DC corona discharge to provide the web with filtration enhancing electret charge, using e.g. methods described in U.S. Reissue Pat. No. 30,782 to van Turnhout and U.S. Pat. No. 4,215,682 to Davis. Hydrocharging may be performed e.g. by impinging jets of water or a stream of water droplets onto the web at a pressure sufficient to provide the web with filtration enhancing electret charge. The pressure necessary to achieve optimum results may vary depending on the type of sprayer used, the particular composition of the fibers, the type and concentration of any charging additives if present, the thickness and density of the web; and, whether pre-treatment, such as DC corona surface treatment, was carried out prior to hydrocharging. An apparatus of the general type useful for hydraulically entangling fibers may be useful for hydrocharging, although a hydrocharging operation may often be carried out at lower pressures than those generally used in hydroentangling. Hydrocharging is understood to also include the methods described in U.S. Pat. No. 5,496,507 to Angadjivand and other various derivative methods for imparting an electret charge using a fluid wetting and dewetting process (as described in, for example, Japanese Patent Application Number JP 2002161467 to Horiguchi).

Other methods of charging (e.g., tribocharging and the like) may also be suitable. A charging operation (of any type) may be performed in-line with the web-production process; or, if desired, the formed web may be stored (e.g., wound into a roll) until such time as it is desired to charge the web.

However achieved, the charging process will produce an electret web as disclosed herein. An X-Ray Discharge Test may be used to identify and/or characterize electret webs. In such a test, the filtration performance of the web is measured before and after exposure of the web to ionizing radiation in the form of X-rays. If the filtration performance is essentially unchanged after exposure to X-rays, this is indicative that very few or no charges were neutralized by the exposure to X-rays and that the web did not have sufficient charges to be considered an electret web. However, if the filtration performance diminishes sufficiently after exposure to X-ray radiation, this result is indicative that the web was an electret web. (The ordinary artisan will appreciate that the ability of such strong measures as ionizing radiation to neutralize such charges does not conflict with the description of electret charges as being "quasi-permanent").

In an X-Ray Discharge test, a % Penetration Ratio (of an aerosol through the web) can be obtained before and after exposure of the web to the X-ray radiation, following the procedures and calculation methods disclosed in PCT International Patent Application Publication WO2014/105107, which is incorporated by reference herein in its entirety. In order for a web to be considered an electret web as defined herein, the % Penetration Ratio is at least about 300%. In various embodiments, the % Penetration Ratio is at least 400%, 500%, or 600%. In further embodiments, the % Penetration Ratio is at least 750% or 800%. In particular embodiments, the % Penetration Ratio is at least 1000%, or at least 1250%. In some embodiments, the % Penetration Ratio is at most about 4000%.

Articles Comprising Electret Web

Spunbonded, charged web 20 may be formed into, or be incorporated into, any desired article, e.g. for purposes of filtration and the like. For such purposes, web 20 may be conveyed to any desired apparatus such as one or more embossing stations, laminators, cutters and the like. If desired, one or more secondary bonding operations (in addition to the autogenous bonding) may be performed. Any such operation may be done in-line with the web-producing operation; or the web may be wound into a storage roll until such time as it is desired to be further processed. Additional layers, for example supporting layers, pre-filter layers, and the like, may be combined (e.g., by lamination) with the webs disclosed herein. Thus, in some embodiments the polylactic acid electret spunbonded webs disclosed herein may be provided as one or more of sublayers in a multilayer article.

Figure 3:
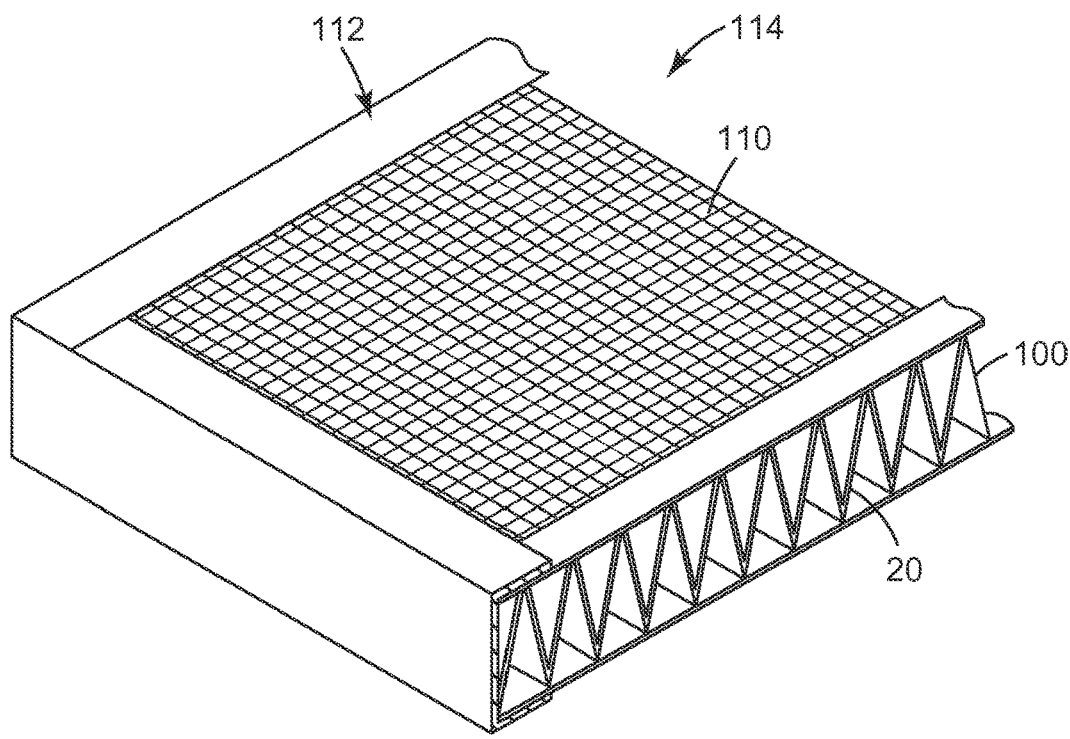
FIG. 3 is a perspective view, partially in section, of an exemplary pleated filter with a perimeter frame and a scrim.

In some embodiments, electret webs as disclosed herein may be used for filtration, e.g. air filtration, in flat (unpleated) form. In other embodiments, electret webs as disclosed herein may be pleated to form a pleated filter for use in applications such as e.g. air filtration. Pleated filters as described herein may be self-supporting, meaning that they do not collapse or bow excessively when subjected to the air pressure typically encountered in forced air ventilation systems. Pleated filters as described herein may optionally comprise one or more scrims and/or a rigid (e.g., cardboard) perimeter frame to enhance the stability of the pleated filter. FIG. 3 shows an exemplary pleated filter 114 with containing filter media comprised of spunbonded web 20 as described herein, and further comprising perimeter frame 112 and scrim 110. Although shown in FIG. 3 as a planar construction in discontinuous contact with one face of the filter media, scrim 110 may be pleated along with the filter media (e.g., so as to be in substantially continuous contact with the filter media). Optional scrim 110 may be comprised of nonwoven material, wire, fiberglass, and so on.

Webs as described herein can exhibit advantageous filtration properties, for example high filtration efficiency in combination with low pressure drop. Such properties may be characterized by any of the well known parameters including percent penetration, pressure drop, Quality Factor, capture efficiency (e.g., Minimum Composite Efficiency, Minimum Efficiency Reporting Value), and the like. In particular embodiments, webs as disclosed herein comprise a Quality Factor of at least about 0.3, 0.4, 0.5, 0.6, 0.7, 0.8, or 1.0.

Heretofore, it has not been found possible to provide satisfactory charging-additive-containing polylactic acid electret webs that retain excellent charge retention and filtration performance upon exposure to high temperatures for extended times. Since products such as e.g. HVAC air filters and the like are often shipped in trucks or railroad cars, which may reach high temperatures for extended periods of time, this deficiency may be limiting to the use of such products.

A possible source of this problem has now been discovered. With reference to Table 2, comparing Illustrative Example IE-A to IE-B, and comparing Illustrative Example IE-C to IE-D, reveals that charging additive can drastically decrease the crystallization rate (as evaluated by the % crystallinity achieved at a cooling speed of 10° C./min in Differential Scanning Calorimetry (DSC) experiments) of polylactic acid when cooled from a melt. Results obtained in meltspinning agree with these findings. That is, it has been found that meltspun polylactic acid fibers that contain charging additive may, during the solidification process, achieve much lower crystallinity than similarly-made fibers that do not contain charging additive. (In fact, the ordinary artisan may expect that since the cooling rate in meltspinning is typically far more rapid than 10° C./min, the effect of charging additive on the % crystallinity of meltspun fibers may often be greater than the effect shown in the DSC data of Table 2.)

Without wishing to be limited by theory or mechanism, it may be that the heretofore observed deterioration in charge retention/filtration ability with high-temperature aging of charging-additive-containing polylactic acid, may result at least partially from crystallization of the polylactic acid during aging at temperatures that approach or exceed the glass transition temperature (typically in the range of 55° C.) of polylactic acid. Such findings are in general agreement with the finding that meltblown charging-additive-containing polylactic acid webs (the fibers of which webs, owing to the nature of the meltblowing process, typically exhibit very low crystallinity as made and thus may be particularly prone to significant increase in crystallinity during high-temperature aging) often lose a great deal of their charge/filtration ability upon high-temperature aging, as attested to in the Examples herein.

With these realizations, the findings documented e.g. in Table 3 of the Examples may now be appreciated. Comparing Illustrative Example IE-4 to Illustrative Example IE-1 reveals that even in the presence of charging additive, sufficient drawing may allow a meltspun polylactic acid fiber to retain a level of crystallinity that is quite close to that of the meltspun fiber in the absence of charging additive. Examination of the series of Illustrative Examples IE-2, IE-3, and IE-4 further illustrates that increasing the degree of drawing serves to increase the crystallinity of a charging-additive-containing meltspun polylactic acid fiber significantly above what it would be in the absence of the drawing. Comparing Illustrative Example IE-4$_t$ to Illustrative Example IE-1$_t$, and examination of the series of items Examples IE-2$_t$, IE-3$_t$, and IE-4$_t$ similarly illustrates this trend.

These Illustrative Examples thus reveal that processing meltspun polylactic acid fibers comprising charging additive at relatively high drawing rates can result in increased crystallinity relative to what would occur in the absence of such high drawing rates. And, it is believed that such increased crystallinity (in addition to providing at least one specific property by which fibers that have been exposed to such high drawing rates may be identified) may unexpectedly and advantageously result in enhanced retention of electret charge over long term aging, as illustrated in the Representative Working Example herein.

The Illustrative Examples further reveal that a suitable thermal exposure (e.g., autogenous bonding, in particular, through-air bonding) may also provide advantageous effects. That is, exposure to through-air bonding process may significantly increase the crystallinity of charging-additive-containing meltspun polylactic acid fibers. Comparing Illustrative Example IE-1$_t$ with IE-1, comparing IE-2$_t$ with IE-2, comparing IE-3$_t$ with IE-3, and comparing IE-4$_t$ with IE-4, illustrates this finding (in all cases, the "$_t$" subscript denotes a through-air bonded sample). These results are surprising at least in that through-air bonding is a relatively short-term thermal exposure that would not necessarily have been expected to impart a significant increase in crystallinity of a meltspun polymer. (In fact, the ordinary artisan might expect that through-air bonding might have the opposite effect, e.g. melting of at least some crystallites and quenching so as to provide a lower, not a higher, crystallinity.) It will be appreciated that through-air bonding appears able to increase the % crystallinity into advantageously high ranges even for meltspun fibers that have been drawn at relatively low drawing rates (as can be seen e.g. by comparing Illustrative Example IE-2 with IE-2$_t$). Therefore, a suitable thermal exposure (e.g., as achieved by through-air bonding) may not necessarily have to be used in combination with very high drawing rates to achieve the advantageous results documented herein.

Thus, in addition to the finding that high drawing rates may impart meltspun charge-additive-containing polylactic acid fibers with a high initial crystallinity, it has also been found that a suitable thermal exposure (e.g., an autogenous bonding process; in particular, a through-air bonding process) may increase the crystallinity of meltspun charge-additive-containing polylactic acid fibers. Furthermore, the achieving and/or retaining of such crystallinity may at least partially help to advantageously and unexpectedly enhance the retention of charge and filtration properties upon high temperature aging of such fibers, as documented in the Examples.

Thus, using compositions and conditions as generally disclosed herein, spunbonded electret webs comprising meltspun, drawn, charged polylactic acid fibers comprising charging additives, may be produced that have excellent filtration properties that may be retained e.g. over high-temperature aging. These findings are demonstrated in FIG.

4, in which a Representative Example web was pleated and formed into an air filter, which air filter was found to exhibit excellent Particle Removal Efficiency, even after being aged for three days at 70° C. These findings are further demonstrated in Table 5, which shows Quality Factor Retention (ratios) of flat webs after being aged for one, four and seven days at 54° C. and 70% relative humidity.

List of Exemplary Embodiments

Embodiment 1 is a spunbonded electret web comprising polylactic acid fibers, wherein at least some of the polylactic acid fibers are meltspun, drawn, charged fibers that comprise from about 0.1 wt. % to about 5.0 wt. % charging additive, and wherein the web is a through-air bonded web. Embodiment 2 is the spunbonded electret web of embodiment 1 wherein the meltspun, drawn polylactic acid fibers comprise from about 0.5 wt. % to about 2.0 wt. % charging additive. Embodiment 3 is the spunbonded electret web of any of embodiments 1-2 wherein the meltspun, drawn polylactic acid fibers exhibit a % crystallinity of at least about 30%. Embodiment 4 is the spunbonded electret web of any of embodiments 1-3 wherein the meltspun, drawn polylactic acid fibers are directly-collected fibers that make up at least about 97 wt. % of the fibrous material of the web. Embodiment 5 is the spunbonded electret web of any of embodiments 1-4 wherein the meltspun, drawn polylactic acid fibers comprise from about 0.1% to about 5.0% of a non-polylactic acid polymeric nucleating agent. Embodiment 6 is the spunbonded electret web of any of embodiments 1-4 wherein the meltspun, drawn polylactic acid fibers contain less than 0.1% of any non-polylactic acid polymeric nucleating agent. Embodiment 7 is the spunbonded web of any of embodiments 1-6 wherein the meltspun, drawn polylactic acid fibers contain less than 0.01% of any non-polymeric nucleating agent.

Embodiment 8 is the spunbonded electret web of any of embodiments 1-7 wherein the meltspun, drawn polylactic acid fibers are comprised of at least about 97 wt. % polylactic acid and wherein the fibers comprise less than about 3 wt. % of any non-polylactic acid polymer. Embodiment 9 is the spunbonded electret web of any of embodiments 1-8 wherein the meltspun, drawn polylactic acid fibers comprise polylactic acid with a mass ratio of L-lactic acid monomer units to D-lactic acid monomer units of from about 97:3 to about 100:0. Embodiment 10 is the spunbonded electret web of any of embodiments 1-8 wherein the meltspun, drawn polylactic acid fibers comprise polylactic acid stereocopolymer with a mass ratio of L-lactic acid monomer units to D-lactic acid monomer units of from about 99:1 to about 99.7:0.3. Embodiment 11 is the spunbonded electret web of any of embodiments 1-10, wherein the polylactic acid fibers also comprise D-polylactic acid homopolymer that is present as a melt additive and that comprises from about 0.5 wt. % to about 10 wt. % of the polylactic acid fibers.

Embodiment 12 is the spunbonded electret web of any of embodiments 1-11 wherein the meltspun, drawn, charged polylactic acid fibers are corona-charged fibers, hydro-charged fibers, corona-hydrocharged fibers, or mixtures thereof. Embodiment 13 is the spunbonded electret web of any of embodiments 1-12 wherein the web exhibits a % Penetration Ratio of at least about 400%. Embodiment 14 is the spunbonded electret web of any of embodiments 1-13 wherein the web comprises a Quality Factor Retention $Q_3/Q_0$ of at least about 75% after being aged for three days at 70° C. at about 15% humidity.

Embodiment 15 is an air filter comprising the spunbonded electret web of any of embodiments 1-14. Embodiment 16 is the air filter of embodiment 15, wherein the web is pleated so as to comprise rows of oppositely-facing pleats and wherein the pleated web is framed with a rigid perimeter frame so that the air filter is a framed air filter. Embodiment 17 is a method of filtering air, the method comprising the step of passing ambient air through the air filter of embodiment 15 or through the framed, pleated air filter of embodiment 16.

Embodiment 18 is a method of making a spunbonded electret web comprising polylactic acid fibers, the method comprising: meltspinning molten filaments comprising polylactic acid that comprises from about 0.1 wt. % to about 5.0 wt. % charging additive; at least partially solidifying the meltspun molten polylactic acid filaments to form meltspun polylactic acid fibers; attenuating the polylactic acid fibers so that the polylactic acid fibers are drawn at an apparent fiber speed of at least about 1000 m/min; collecting the drawn polylactic acid fibers as a mat of polylactic acid fibers; through-air bonding the mat of polylactic acid fibers to transform the mat of polylactic acid fibers into a web of autogenously-bonded polylactic acid fibers; and, charging at least some of the meltspun polylactic acid fibers.

Embodiment 19 is the method of embodiment 18 wherein the charging of at least some of the fibers comprises corona charging, hydrocharging, or corona-hydrocharging. Embodiment 20 is the method of any of embodiments 18-19 wherein the charging of the fibers comprises charging the web of autogenously-bonded polylactic acid fibers. Embodiment 21 is the method of any of embodiments 18-20 wherein the polylactic acid fibers are drawn at an apparent fiber speed of at least about 2000 m/min. Embodiment 22 is the method of any of embodiments 18-20 wherein the polylactic acid fibers are drawn at an apparent fiber speed of at least about 3000 m/min Embodiment 23 is the method of any of embodiments 18-22 wherein the through-air bonding is performed with moving air heated to a temperature of at least approximately 120° C. Embodiment 24 is the method of any of embodiments 18-22 wherein the through-air bonding is performed with moving air heated to a temperature of at least approximately 150° C. Embodiment 25 is the method of any of embodiments 18-24 further comprising the step of pleating the web of autogenously-bonded polylactic acid fibers and attaching a rigid perimeter frame to a perimeter of the pleated web, to form a framed, pleated air filter.

EXAMPLES

Materials

Various materials used in the Examples are listed in Table 1.

TABLE 1

| Material | Description |
| --- | --- |
| Polylactic Acid 1; PLA-1 | 6100D; Melt Flow Index 24; Natureworks LLC |
| Polylactic Acid 2; PLA-2 | 6202D; Melt Flow Index 15-30; Natureworks LLC |
| Polylactic Acid 3; PLA-3 | SYNTERRA PDLA 1010; Melt Flow Index 22; Synbra Technology |
| Polypropylene; PP-1 | 3860X, Melt Flow Index 100; Total Petrochemicals |

TABLE 1-continued

| Material | Description |
|---|---|
| Charging Additive 1; CA-1 | Poly6-(1,1,3,3-tetramethylbutyl)amino-1,3,5-triazine-2,4-diyl(2,2,6,6-tetramethyl-4-piperidinyl)imino-1,6-hexanediyl(2,2,6,6-tetramethyl-4-piperidinyl)imino |

Test Procedures

% Crystallinity

The percent crystallinity of polymer samples may be determined by using a TA Instruments Q2000 Modulated Differential Scanning Calorimeter (MDSC) or the equivalent. A specimen is weighed and loaded into a compatible aluminum pan. The sample is heated at a heating rate of 10° C. per minute from room temperature to a temperature approximately 30° C. above the estimated melting point of the material, to provide a melting curve. The heats of melting and heat of cold crystallization are determined by integrating areas under the respective peaks of the melting curve. The percent crystallinity is then obtained by subtracting the heat of cold crystallization from the heat of melting and dividing the different by the reference heat of melting (as known for the polymer in question).

Solidity

Solidity may be determined by the general methods described in U.S. Pat. No. 8,162,153 (columns 11 and 12) to Fox, said descriptions being incorporated by reference herein.

% Penetration, Pressure Drop, and Quality Factor

Percent penetration, pressure drop and the filtration Quality Factor (QF) of a web sample is determined using a challenge aerosol containing DOP (dioctyl phthalate) liquid droplets, delivered (unless otherwise indicated) at a flow rate of 85 liters/min to provide a face velocity of 14 cm/s, and evaluated using a TSI™ Model 8130 high-speed automated filter tester (commercially available from TSI Inc.). For DOP testing, the aerosol may contain particles with a diameter of about 0.185 μm, and the Automated Filter Tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments) may be employed to measure pressure drop (ΔP, mm H$_2$O) through the filter. The equation:

$$QF = \frac{-\ln\left(\frac{\% \text{ Particle Penetration}}{100}\right)}{\Delta P}$$

may be used to calculate QF. The initial Quality Factor QF value usually provides a reliable indicator of overall performance, with higher initial QF values indicating better filtration performance and lower initial QF values indicating reduced filtration performance. Units of QF are inverse pressure drop (reported in 1/mm H$_2$0). For aged samples, a Quality Factor Retention parameter may be calculated by taking the ratio of the Quality Factor after aging, to the initial Quality Factor ($Q_0$) achieved prior to aging. For web samples in which the pressure drop is very low, two or more layers of web sample may be stacked atop each other to obtain an overall pressure drop in the range that the testing may be more easily performed. The use of multilayer samples in this manner is not expected to significantly change the Quality Factor obtained.

Capture Efficiency

Filtration properties of a filter may be determined by testing according to ASHRAE Standard 52.2 ("Method of Testing General Ventilation Air-Cleaning Devices for Removal Efficiency by Particle Size"). The test involves configuring the web as a filter (e.g., a pleated and/or framed filter), installing the filter into a test duct, and subjecting the filter to potassium chloride particles which have been dried and charge-neutralized. A test face velocity of 1.5 meters/sec may be employed. An optical particle counter may be used to measure the concentration of particles upstream and downstream from the test filter over a series of twelve particle size ranges or channels. The equation:

$$\text{Capture efficiency } (\%) = \frac{\text{upstream particle count} - \text{downstream particle count}}{\text{upstream particle count}} \times 100$$

may be used to determine capture efficiency (sometimes referred to as particle removal efficiency) for each channel. Pressure drop across the filter is measured on the clean filter. From the initial efficiency curve, the four efficiency values between 0.3 and 1.0 μm may be averaged to provide the E1 efficiency, the four efficiency values between 1.0 and 3.0 μm may be averaged to provide the E2 efficiency, and the four efficiency values between 3.0 and 10.0 μm may be averaged to provide the E3 efficiency.

Illustrative Examples

% Crystallinity of DSC-Cooled Samples

Meltspun web samples were obtained of various compositions. A first sample was comprised of PLA-1 and was used as Illustrative Example IE-A. A second sample was comprised of 99 wt. % PLA-1 and 1 wt. % of a representative hindered amine charging additive and was used as Illustrative Example IE-B. A third sample comprised 3 wt. % of polypropylene PP-1 with the balance (97 wt. %) being PLA-1, and was used as Illustrative Example IE-C. A fourth sample was comprised of 3 wt. % of polypropylene PP-1 and 1 wt. % of the representative hindered amine charging additive with the balance (96 wt. %) being PLA-1, and was used as Illustrative Example IE-D.

Each sample was weighed and loaded into a compatible aluminum pan. Each sample was then heated at a heating rate of approximately 10° C. per minute from room temperature to at least approximately 190° C. (the reported melting point of the polylactic acid being 165-180° C.). Each sample was held for a sufficient time to ensure that the sample was completely melted, so as to completely erase any existing thermal history present in the sample. Each sample was then cooled to room temperature at a cooling rate of approximately 10° C. per minute. The percent crystallinity of each sample was then measured as described in the % Crystallinity method above. The results are presented in Table 2.

TABLE 2

| Sample | Charging additive (wt. %) | % Crystallinity |
|---|---|---|
| IE-A | 0 | 17% |
| IE-B | 1.0 | 1% |

TABLE 2-continued

| Sample | Charging additive (wt. %) | % Crystallinity |
|---|---|---|
| IE-C | 0 | 41% |
| IE-D | 1.0 | 4% |

% Crystallinity of Spunbonded Web Samples.

Spunbonded web samples were made in generally similar manner as described for the Representative Working Examples Below, using PLA-1 and a representative hindered amine charging additive. The webs were through-air bonded at an air temperature set at approximately 160° C. The attenuator was operated at various conditions (differential pressure), which provided apparent fiber speeds as noted. The resulting % crystallinity for the thus-made fiber samples is presented in Table 3.

TABLE 3

| | Composition (wt. %) | | Apparent | | | |
|---|---|---|---|---|---|---|
| Sample | Polylactic acid | Charging additive | Attenuator Pressure (kPa) | Fiber Speed (m/min) | Through-air bonded | % Crystallinity |
| IE-1 | 100% | | 124 | 3940 | No | 45% |
| IE-1$_t$ | 100% | | 124 | 3940 | Yes | 55% |
| IE-2 | 99% | 1% | 41 | 2680 | No | 19% |
| IE-2$_t$ | 99% | 1% | 41 | 2680 | Yes | 31% |
| IE-3 | 99% | 1% | 83 | 3690 | No | 29% |
| IE-3$_t$ | 99% | 1% | 83 | 3690 | Yes | 52% |
| IE-4 | 99% | 1% | 124 | 4350 | No | 40% |
| IE-4$_t$ | 99% | 1% | 124 | 4350 | Yes | 57% |

Representative Working Examples

Using an apparatus similar to that shown in FIGS. 1 and 2, spunbonded webs were formed from PLA-2, to which was added (as a melt additive) approximately 0.8% by weight of a charging additive comprising CA-1. A 2" extruder was used, which delivered molten extrudate via a gear pump into an extrusion die of approximate width 41 cm (16.2 inches). The die had 26 rows of 60 orifices each for a total of 1560 orifices (orifice diameter 0.35 mm). The flowrate of molten polymer was approximately 0.47 grams per orifice per minute and the overall extrusion rate was approximately 44.0 kg (96.9 pounds) per hour. The extrusion temperature was set at approximately 230° C. Two opposed quenching air streams (similar to those shown as 18b in FIG. 1; streams of the type shown as 18a were not employed) were supplied as an upper stream from quench boxes 16 in. (406 mm) in height at an approximate face velocity of 1.3 m/sec and as a lower stream from quench boxes 7.75 in. (197 mm) in height at an approximate face velocity of 0.5 m/sec. The upper and lower streams were slightly chilled; the exact temperatures were not recorded but were estimated to be in the range of 10-15° C.

A movable-wall attenuator similar to that shown in U.S. Pat. Nos. 6,607,624 and 6,916,752 was employed, with an attenuator top gap width of 7.6 mm, an attenuator bottom gap width of 6.2 mm, and an attenuation chamber length of 6 in (152 mm). Air was fed to the attenuator at a pressure of 97 kPa. These conditions combined to provide an apparent fiber speed in the range of approximately 4200 meters/minute. The distance from the extrusion head to the attenuator was 31 in. (79 cm), and the distance from the attenuator to the collection belt was 27 in. (69 cm). The meltspun fibers were deposited as a mat on a porous collection belt made from 20-mesh stainless steel and moving at a velocity ("forming speed") of approximately 83 feet (25.3 meters) per minute. A vacuum was established (by a device of the general type shown as item 14 on FIG. 1) under the collection belt of approximately 700 Pa (nominal set point), which assisted in collecting the fibers on the belt.

The mat of collected meltspun fibers was then passed underneath a through-air bonding device to autogenously bond at least some of the fibers together. Air was supplied through the bonding device at a velocity of approximately 3.2 m/sec at an air outlet slot, which was 15.2 cm (in downweb extent) by 76 cm (in crossweb extent). The air outlet was about 3.8 cm from the mat as the mat passed underneath the bonding device. The temperature of the air passing through the slot of the bonding device was approximately 150° C. as measured at the entry point for the heated air into the device. The web (still resting on the collection belt) passed into ambient air after passing underneath the bonding device. An extended portion of the above-described vacuum device extended downweb past the bonding device in the general manner pictured for vacuum device 14 and through-air bonder 101 in FIG. 1.

A web thus produced was found to be bonded with sufficient integrity to be self-supporting and handleable using normal processes and equipment. The web was then charged by corona discharge. Charging was accomplished by passing the web on a grounded surface under a positive DC corona source generating a discharge exposure of about 1 microC/cm$^2$. Various parameters as obtained for this web are listed in Table 4.

TABLE 4

| Property | Units | Value |
|---|---|---|
| Basis weight | g/m$^2$ | 64 |
| Thickness | mm | 0.53 |
| Pressure drop at 14 cm/s | mm H$_2$O | 1.07 |
| Solidity | % | 9.9 |
| % Penetration DOP at 14 cm/s | % | 81 |
| Quality Factor | 1/mm H$_2$O | 0.56 |

Figure 4:
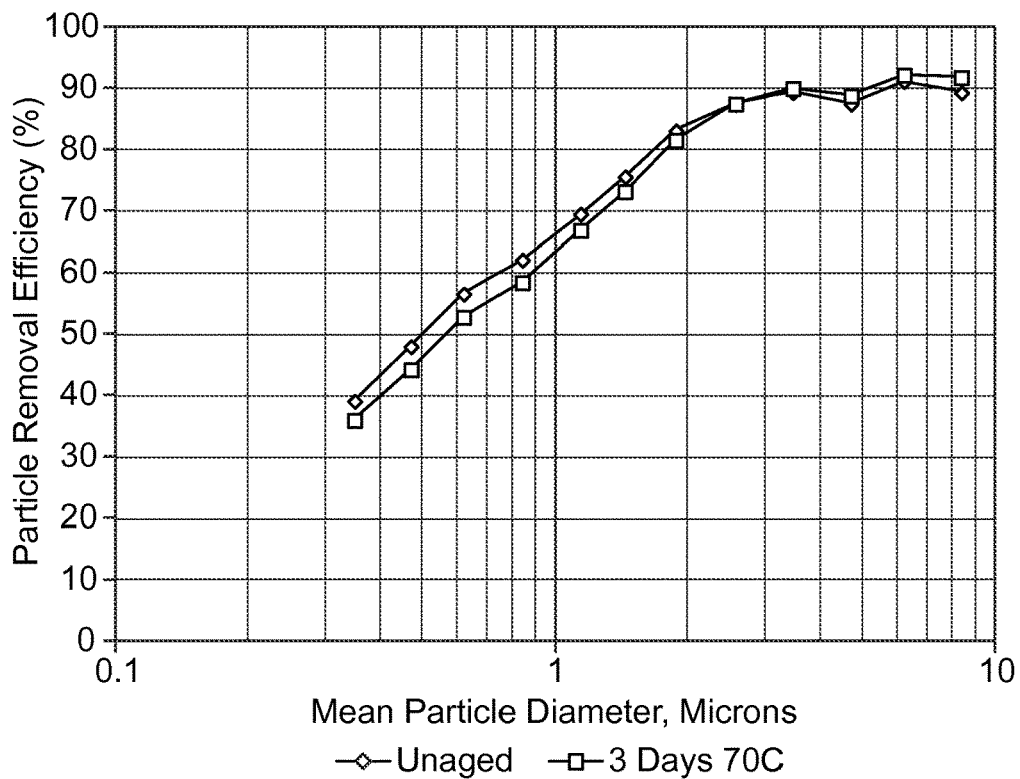
FIG. 4 depicts the experimentally obtained Particle Removal Efficiency of a pleated filter as disclosed herein.

Samples of the above-described flat webs were pleated with approximately 19 mm pleat height and 7.3 mm pleat spacing (tip to-tip). The pleated webs were then assembled with wire and a channel frame in a manner similar to the product available from 3M Company, St. Paul Minn. under the trade designation FILTRETE 1500 ULTRA ALLERGEN, to provide a nominal 16"×25"×1" framed filter. The assembled pleated filters were evaluated according to ASHRAE Standard 52.2. Evaluations were performed on an unaged pleated filter and on a pleated filter that had been aged for three days at 70° C. (the aging was performed in an oven that heated ambient (room) air to 70° C.; thus, while the relative humidity in the oven was not monitored it was expected to be quite low, e.g. less than about 10%). The Particle Removal (Capture) Efficiency data obtained from this testing is shown in FIG. 4. These data reveal that the E1 and E2 efficiency after aging were within approximately 5-10% of the initial values, and the E3 efficiency actually increased by at least approximately 5%.

Other charged flat web samples were made in generally similar manner as described above although with a nominal 9 inch (22 cm) width die rather than with a nominal 16.5 inch die. A representative sample, when subjected to an X-Ray Discharge evaluation as described earlier herein, exhibited a % Penetration Ratio in the range of approximately 1500%. Certain of these samples were subjected to a DOP aerosol filtration test and Quality Factors obtained.

Samples were then aged for various times at approximately 54° C. and 70% relative humidity. The resulting Quality Factor Retention parameters ($Q_r/Q_0$ ratios, presented in percent) are presented in Table 5. In these data, $Q_0$ is the initial Quality Factor, and $Q_1$, $Q_4$, and $Q_7$ are respectively, the Quality Factors obtained after 1, 4 and 7 days aging. These data reveal that at least approximately 90% of the initial Quality Factor was retained over 1, 4 and 7 days aging at the above conditions.

TABLE 5

| Property | Quality Factor (1/mm H$_2$0) | Quality Factor Retention |
| --- | --- | --- |
| $Q_0$ | 0.71 | |
| $Q_1/Q_0$ | | 92% |
| $Q_4/Q_0$ | | 93% |
| $Q_7/Q_0$ | | 91% |

Variation Working Examples

Crystallization rates of various other polylactic acid-containing compositions (e.g. PLA-2; PLA-2 with PP-1; PLA-2 with PLA-3 and PP-1; all with and without a representative charging additive) were also evaluated. Numerous other spunbonded electret webs (comprising e.g. Polylactic Acid 2, and Polylactic Acid 2 with Polypropylene 1 melt additive) were formulated and % crystallinities obtained. In particular, meltspun fibers comprising PLA-2 (96 wt. %), PP-1 (3 wt. %), and a representative hindered amine charging additive (1 wt. %) were made (all of which were drawn at an apparent fiber speed of 3850 m/min) with and without being through-air bonded (at an air temperature of 140° C.). In this particular case, the through-air bonding was found to increase the % crystallinity significantly (from approximately 26.4% in the absence of through-air bonding, to approximately 49.1% in the presence of through-air bonding).

Variations of process conditions (e.g. attenuator pressure, through-air bonder temperature, and so on) were performed. Spunbonded electret webs were also made with various other charging additives. Webs were also charged via hydrocharging rather than by corona charging. In general, the qualitative trends described above were followed.

Comparative Example Meltblown Webs

For purposes of comparison, meltblown fibers were made of PLA-2 (96 wt. %), PP-1 (3 wt. %) and a representative charging additive (1 wt. %), using conventional meltblowing methods. The % crystallinity of the meltblown fibers was very low (typically less than 5%). The meltblown fiber webs were corona-charged in similar manner as described above. These charging-additive-containing meltblown polylactic acid samples were typically found to exhibit poor ability to be charged. Moreover, the samples were found to exhibit significant falloff in charge retention with high-temperature aging (as monitored e.g. by Quality Factor Retention ($Q_3/Q_0$) at three days time). It should be noted that annealing meltblown webs at high temperatures (e.g., 100 or 130° C. for one hour) did significantly increase the % crystallinity of the meltblown polylactic acid fibers. However, upon corona-charging these meltblown annealed webs, it was found that while the annealed meltblown webs did exhibit increased ability to be charged and did exhibit somewhat increased ability to retain such charge, the annealed, corona-charged meltblown webs did not achieve the excellent charge retention of the herein-disclosed meltspun webs. (Typically, the $Q_3/Q_0$ Quality Factor Retention of the annealed/charged meltblown webs, after three days aging at 70° C., remained below 60%.) Although once again not wishing to be limited by theory or mechanism, these results suggest that while the crystallization behavior of charge-additive-containing polylactic acid fibers (and, particularly, the interplay of composition and processing history on the crystallization behavior) may be important, it also seems that the herein-disclosed drawing and thermal treatment (e.g. through-air bonding) of meltspun charging-additive-containing polylactic fibers may provide unique effects that are not achievable e.g. merely by long-term annealing of e.g. meltblown fibers to increase their crystallinity.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document incorporated by reference herein, this specification as written will control.

What is claimed is:

1. A spunbonded electret web comprising polylactic acid fibers, wherein at least some of the polylactic acid fibers are meltspun, drawn, charged fibers that comprise from about 0.1 wt. % to about 5.0 wt. % charging additive, and wherein the web is a through-air bonded web.

2. The spunbonded electret web of claim 1 wherein the meltspun, drawn polylactic acid fibers comprise from about 0.5 wt. % to about 2.0 wt. % charging additive.

3. The spunbonded electret web of claim 1 wherein the meltspun, drawn polylactic acid fibers exhibit a % crystallinity of at least about 30%.

4. The spunbonded electret web of claim 1 wherein the meltspun, drawn polylactic acid fibers are directly-collected fibers that make up at least about 97 wt. % of the fibrous material of the web.

5. The spunbonded electret web of claim 1 wherein the meltspun, drawn polylactic acid fibers comprise from about 0.1% to about 5.0% of a non-polylactic acid polymeric nucleating agent.

6. The spunbonded electret web of claim 1 wherein the meltspun, drawn polylactic acid fibers contain less than 0.1% of any non-polylactic acid polymeric nucleating agent.

7. The spunbonded web of claim 1 wherein the meltspun, drawn polylactic acid fibers contain less than 0.01% of any non-polymeric nucleating agent.

8. The spunbonded electret web of claim 1 wherein the meltspun, drawn polylactic acid fibers are comprised of at least about 97 wt. % polylactic acid and wherein the fibers comprise less than about 3 wt. % of any non-polylactic acid polymer.

9. The spunbonded electret web of claim 1 wherein the meltspun, drawn polylactic acid fibers comprise polylactic acid with a mass ratio of L-lactic acid monomer units to D-lactic acid monomer units of from about 97:3 to about 100:0.

10. The spunbonded electret web of claim 1 wherein the meltspun, drawn polylactic acid fibers comprise polylactic acid stereocopolymer with a mass ratio of L-lactic acid monomer units to D-lactic acid monomer units of from about 99:1 to about 99.7:0.3.

11. The spunbonded electret web of claim 1, wherein the polylactic acid fibers also comprise D-polylactic acid homopolymer that is present as a melt additive and that comprises from about 0.5 wt. % to about 10 wt. % of the polylactic acid fibers.

12. The spunbonded electret web of claim 1 wherein the meltspun, drawn, charged polylactic acid fibers are corona-charged fibers, hydrocharged fibers, corona-hydrocharged fibers, or mixtures thereof.

13. The spunbonded electret web of claim 1 wherein the web exhibits a % Penetration Ratio of at least about 400%.

14. The spunbonded electret web of claim 1 wherein the web comprises a Quality Factor Retention $Q_3/Q_0$ of at least about 75% after being aged for three days at 70° C. at about 15% humidity.

15. An air filter comprising the spunbonded electret web of claim 1.

16. The air filter of claim 15, wherein the web is pleated so as to comprise rows of oppositely-facing pleats and wherein the pleated web is framed with a rigid perimeter frame so that the air filter is a framed air filter.

17. A method of filtering air, the method comprising the step of passing ambient air, as motivated by a motorized blower, through the framed, pleated air filter of claim 16.

18. A method of making a spunbonded electret web comprising polylactic acid fibers, the method comprising:
    meltspinning molten filaments comprising polylactic acid that comprises from about 0.1 wt. % to about 5.0 wt. % charging additive;
    at least partially solidifying the meltspun molten polylactic acid filaments to form meltspun polylactic acid fibers;
    attenuating the polylactic acid fibers so that the polylactic acid fibers are drawn at an apparent fiber speed of at least about 1000 m/min;
    collecting the drawn polylactic acid fibers as a mat of polylactic acid fibers;
    through-air bonding the mat of polylactic acid fibers to transform the mat of polylactic acid fibers into a web of autogenously-bonded polylactic acid fibers; and,
    charging at least some of the meltspun polylactic acid fibers.

19. The method of claim 18 wherein the charging of at least some of the fibers comprises corona charging, hydrocharging, or corona-hydrocharging.

20. The method of claim 18 wherein the charging of the fibers comprises charging the web of autogenously-bonded polylactic acid fibers.

21. The method of claim 18 wherein the polylactic acid fibers are drawn at an apparent fiber speed of at least about 2000 m/min.

22. The method of claim 18 wherein the polylactic acid fibers are drawn at an apparent fiber speed of at least about 3000 m/min.

23. The method of claim 18 wherein the through-air bonding is performed with moving air heated to a temperature of at least approximately 120° C.

24. The method of claim 18 wherein the through-air bonding is performed with moving air heated to a temperature of at least approximately 150° C.

25. The method of claim 18 further comprising the step of pleating the web of autogenously-bonded polylactic acid fibers and attaching a rigid perimeter frame to a perimeter of the pleated web, to form a framed, pleated air filter.

* * * * *

UNITED STATES PATENT AND TRADEMARK OFFICE
CERTIFICATE OF CORRECTION

PATENT NO. : 10,273,612 B2
APPLICATION NO. : 15/506213
DATED : April 30, 2019
INVENTOR(S) : Liming Song et al.

It is certified that error appears in the above-identified patent and that said Letters Patent is hereby corrected as shown below:

In the Drawings

Sheet 3 of 3 (Fig. 4)
Line 2 (Approx.) (x-axis), Delete "70C" and insert -- 70° C. --, therefor.

In the Specification

Column 4
Line 1, Delete "hydroxybutryic" and insert -- hydroxybutyric --, therefor.

Column 5
Line 18, Delete "tetraalkylgroups" and insert -- tetraalkyl groups --, therefor.

Column 15
Line 58, Delete "$H_20$)." and insert -- $H_2O$). --, therefor.

Column 19
Line 13 (Approx.), Delete "$H_20$)" and insert -- $H_2O$) --, therefor.

Signed and Sealed this
Thirty-first Day of December, 2019

Andrei Iancu
*Director of the United States Patent and Trademark Office*